United States Patent
Tanaka (10) Patent No.: US 7,903,312 B2
(45) Date of Patent: Mar. 8, 2011

(54) OPTICAL SCANNING DEVICE, IMAGING DISPLAY DEVICE, AND RETINAL SCANNING DISPLAY

(75) Inventor: Mitsugi Tanaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 435 days.

(21) Appl. No.: 12/071,702

(22) Filed: Feb. 25, 2008

(65) Prior Publication Data
US 2009/0002791 A1    Jan. 1, 2009

Related U.S. Application Data (63) Continuation-in-part of application No. PCT/JP2006/316731, filed on Aug. 25, 2006.

(30) Foreign Application Priority Data

Aug. 26, 2005  (JP) .................. 2005-246119
Dec. 28, 2005  (JP) .................. 2005-380247

(51) Int. Cl.
*G02B 26/08* (2006.01)
(52) U.S. Cl. ...................... 359/202.1
(58) Field of Classification Search .......... 359/202.1, 359/205.1, 208.1, 201.1, 201.2
See application file for complete search history.

(56) References Cited

U.S. PATENT DOCUMENTS

| 4,997,242 A | | 3/1991 | Amos |
| 6,134,002 A | * | 10/2000 | Stimson et al. ........... 356/326 |
| 2003/0142086 A1 | | 7/2003 | Watanabe et al. |
| 2004/0119664 A1 | | 6/2004 | Inoguchi et al. |

FOREIGN PATENT DOCUMENTS

| EP | 0 423 112 B1 | 4/1991 |
| JP | A-62-265613 | 11/1987 |
| JP | A-04-501615 | 3/1992 |
| JP | A-05-080269 | 4/1993 |
| JP | A-06-313858 | 11/1994 |
| JP | A-11-109278 | 4/1999 |
| JP | A-2003-295108 | 10/2003 |
| JP | A-2003-315726 | 11/2003 |
| JP | A-2004-184773 | 7/2004 |
| WO | WO 90/00755 | 1/1990 |

* cited by examiner

*Primary Examiner* — Euncha P Cherry
(74) *Attorney, Agent, or Firm* — Oliff & Berridge, PLC (57) ABSTRACT

The present invention provides an optical scanning device, an imaging display device and a retinal scanning display which can be further miniaturized. The optical scanning device includes a vertical scanning system for scanning an incident optical flux in a primary direction and a horizontal scanning system for scanning the optical flux scanned in a secondary direction intersecting the primary direction. The optical scanning device further includes a relay optical system arranged between a Galvano mirror in the vertical scanning system and a Galvano mirror in the horizontal scanning system. The relay optical system includes at least a condensing mirror for guiding the optical flux scanned in the primary direction by the Galvano mirror in the vertical scanning system to the Galvano mirror in the horizontal scanning system.

14 Claims, 10 Drawing Sheets

OPTICAL SCANNING DEVICE, IMAGING DISPLAY DEVICE, AND RETINAL SCANNING DISPLAY

CROSS-REFERENCE TO RELATED APPLICATIONS

The present application is a Continuation-in-Part of International Application No. PCT/JP2006/316731 filed Aug. 25, 2006, which claims the benefits of Japanese Patent Applications No. 2005-246119 filed Aug. 26, 2005, and Japanese Patent Applications No. 2005-380247 filed Dec. 28, 2005.

BACKGROUND OF THE INVENTION

1. Field of the Invention

The present invention relates to an optical scanning device, an imaging display device and a retinal scanning display, and more particularly to an optical scanning device, an imaging display device and a retinal scanning display which include a primary scanning part for scanning an optical flux in a primary direction and a secondary scanning part for scanning the optical flux scanned in the primary direction in a secondary direction which intersects the primary direction.

2. Description of the Related Art

Conventionally, an imaging display device for displaying an image includes an optical scanning device for scanning an optical flux or the like. Further, such an optical scanning device is configured to display an image by scanning an optical flux by performing various controls including a control to oscillate a reflection mirror for reflecting the optical flux.

Particularly, the optical scanning device includes a horizontal scanning part for scanning the optical flux in a horizontal direction, a vertical scanning part for scanning the optical flux in a vertical direction and the like. In such a constitution, for example, the optical flux is incident on the horizontal scanning part and is scanned in the horizontal direction by the horizontal scanning part. Then, the optical flux scanned in the horizontal direction is incident on the vertical scanning part and is scanned in the vertical direction by the vertical scanning part. The optical flux scanned in the vertical direction in this manner is projected on a retina of an eye or the like thus displaying an image.

Further, for example, as described in patent document 1 (JP-A-2003-295108), in such an optical scanning device, the optical flux scanned in the horizontal direction by the horizontal scanning part is diffused. Accordingly, a relay optical system which uses a convex-surface lens for transforming the diffused optical flux to a parallel optical flux, a convex-surface lens for condensing the parallel optical flux and the like is arranged between the horizontal scanning part and the vertical scanning part. The relay optical system guides the optical flux scanned by the horizontal scanning part to the vertical scanning part.

SUMMARY OF THE INVENTION

However, in the above-mentioned optical scanning device, although the optical flux is scanned in the primary direction as well as in the secondary direction by the horizontal scanning part and the vertical scanning part, there exists a demand for further miniaturization of the optical scanning device by saving a space for arranging the relay optical system and the like which are provided between the horizontal scanning part and the vertical scanning part.

Further, in assembling the optical scanning device, it has been necessary to individually adjust positions of the respective parts and hence, the position adjusting operation becomes cumbersome. Further, since the parts are individually adjusted, it is difficult to enhance the accuracy in adjustment of the optical scanning device as a whole.

To overcome the above-mentioned drawback, according to a first aspect of the present invention, there is provided an optical scanning device which includes: a primary scanning part for scanning an incident optical flux in a primary direction; a secondary scanning part for scanning the optical flux scanned in the primary direction in a secondary direction which intersects the primary direction; and a relay optical system arranged between the primary scanning part and the secondary scanning part, the relay optical system including at least a condensing mirror for guiding an optical flux scanned in the primary direction by the primary scanning part to the secondary scanning part.

To overcome the above-mentioned drawback, according to a second aspect of the present invention, there is provided an imaging display device which includes the above-mentioned optical scanning device according to the first aspect of the present invention, wherein the optical flux modulated in response to an image signal is scanned in the primary direction as well as in the secondary direction by the optical scanning device to display an image.

To overcome the above-mentioned drawback, according to a third aspect of the present invention, there is provided a retinal scanning display which includes the above-mentioned optical scanning device according to the first aspect of the present invention, wherein the optical flux modulated in response to an image signal is scanned in the primary direction as well as in the secondary direction by the optical scanning device, and the scanned optical flux is guided to a retina of an eye to display an image on the retina by projection.

PREFERRED EMBODIMENTS OF THE PRESENT INVENTION

Hereinafter, preferred embodiments of the present invention are explained in conjunction with drawings.

[Constitution of Imaging Display Device]

Hereinafter, one embodiment of an imaging display device according to the present invention is explained in conjunction with the drawings. First of all, the constitution of a retinal scanning display 1 which constitutes one example of the imaging display device according to the present invention is explained in conjunction with FIG. 1.

Figure 1:
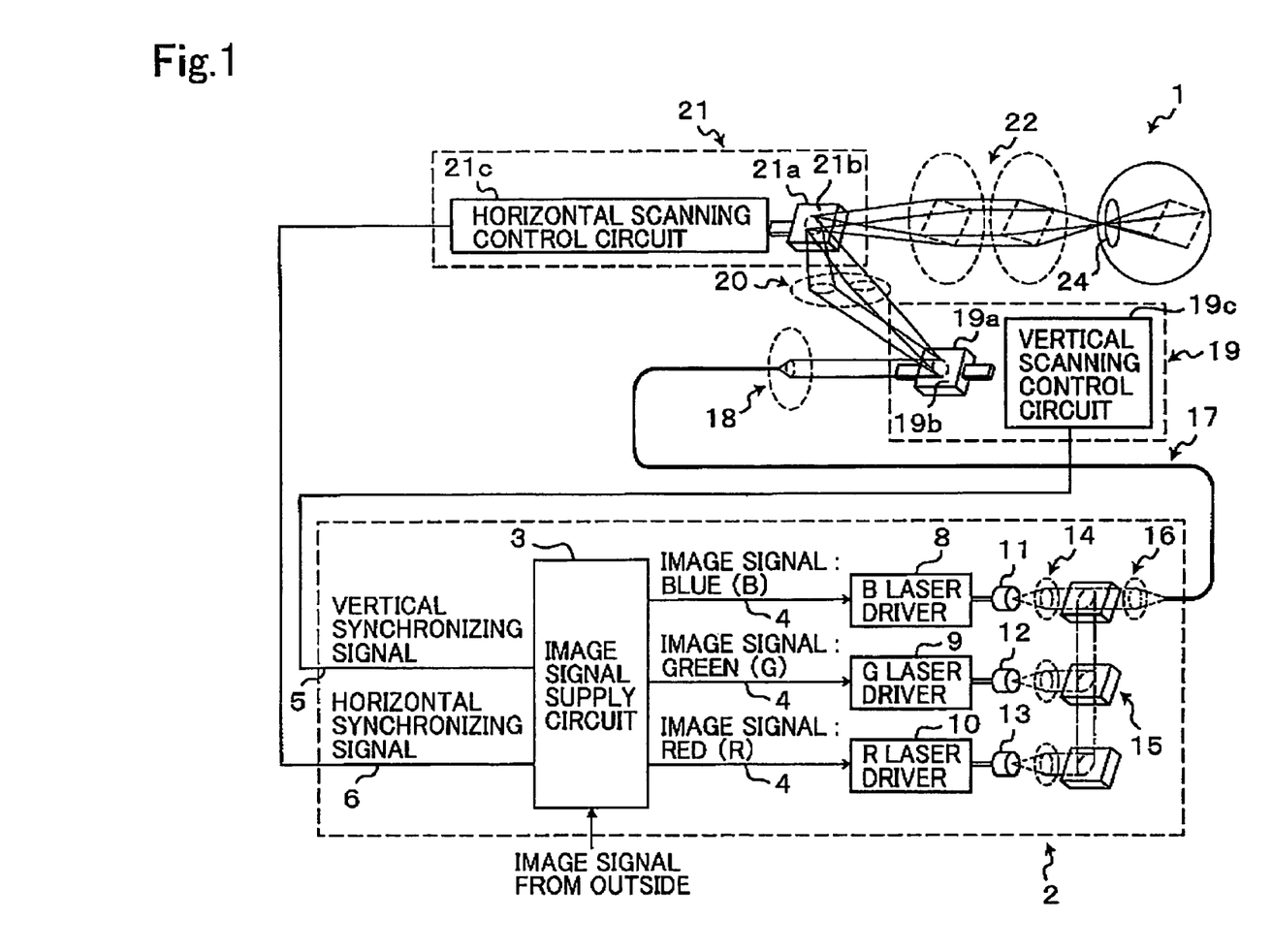
FIG. 1 is an explanatory view showing a retinal scanning display 1 according to this embodiment.

As shown in FIG. 1, in the retinal scanning display 1, a light source unit part 2 is provided for processing image signals supplied from the outside. The light source unit part 2 includes an image signal supply circuit 3 to which the image signal is inputted from the outside. The image signal supply circuit 3 generates respective signals which become elements for synthesizing an image in response to the image signals. An image signal 4, a vertical synchronizing signal 5 and a horizontal synchronizing signal 6 are outputted from the image signal supply circuit 3. The light source unit part 2 also includes an R laser driver 10, a G laser driver 9 and a B laser driver 8. These laser drivers 10, 9, 8 are provided for driving an R laser 13, a G laser 12 and a B laser 11 such that these lasers 13, 12, 11 radiate laser beams whose intensities are respectively modulated in response to the respective image signals of red (R), green (G) and blue (B) transmitted from the image signal supply circuit 3 as image signals 4. Further, the light source unit part 2 includes collimation optical systems 14 for collimating laser beams radiated from the respective lasers into parallel lights, dichroic mirrors 15 for optically multiplexing collimated laser beams and a coupling optical system 16 for guiding the multiplexed laser beams into an optical fiber 17. The R laser 13, the G laser 12 and the B laser 11 may be formed of a semiconductor laser such as a laser diode or a solid laser. The light source unit part 2 of this embodiment exemplifies one example of at least one light source and a modulation part which modulates intensity of an optical flux radiated from the light source in response to the image signal.

Further, the retinal scanning display 1 also includes a first relay optical system 18 for guiding the laser beams transmitted from the light source unit part 2 to a vertical scanning system 19, the vertical scanning system 19 for scanning the collimated laser beams in the vertical direction by making use of a Galvano mirror 19a, a second relay optical system 20 for guiding the laser beams scanned by the vertical scanning system 19 to a horizontal scanning system 21, the horizontal scanning system 21 for scanning the laser beams which are scanned by the vertical scanning system 19 and are incident thereon by way of the second relay optical system 20 in the horizontal direction by making use of a Galvano mirror 21, and a third relay optical system 22 for allowing the laser beams scanned by the horizontal scanning system 21 to be incident on a pupil 24 of a viewer. The second relay optical system 20 is provided for conjugating the Galvano mirror 19a in the vertical scanning system 19 and the Galvano mirror 21a in the horizontal scanning system 21, and the third relay optical system 22 is provided for conjugating the Galvano mirror 21a and the pupil 24 of the viewer respectively.

As one specific example, the vertical scanning system 19 is an optical system which performs vertical scanning (one example of primary scanning) for scanning the laser beams in the vertical direction for each scanning line of an image to be displayed. Further, the vertical scanning system 19 includes the Galvano mirror 19a for scanning the laser beams in the vertical direction and a vertical scanning control circuit 19c which performs a driving control of the Galvano mirror 19a.

On the other hand, the horizontal scanning system 21 is an optical system which performs a horizontal scanning (one example of secondary scanning) for scanning the laser beams in the horizontal direction from a primary scanning line toward a last scanning line for every frame of the image to be displayed. Further, the horizontal scanning system 21 includes the Galvano mirror 21a which performs the horizontal scanning and a horizontal scanning control circuit 21c which performs a driving control of the Galvano mirror 21a.

Figure 2A:
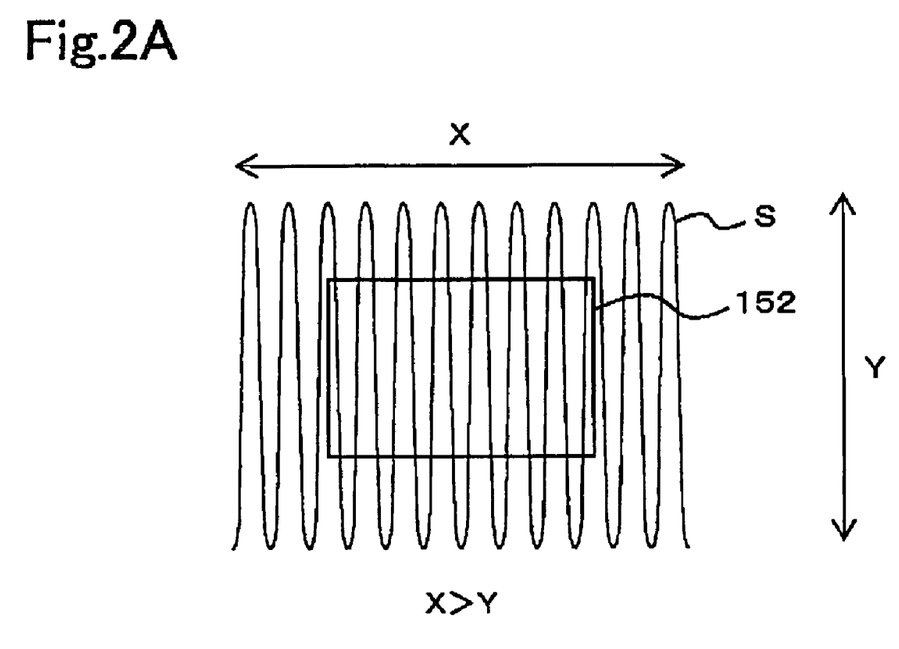
FIG. 2A and FIG. 2B are explanatory views showing a scanning mode of a beam light in this embodiment.
Figure 2B:
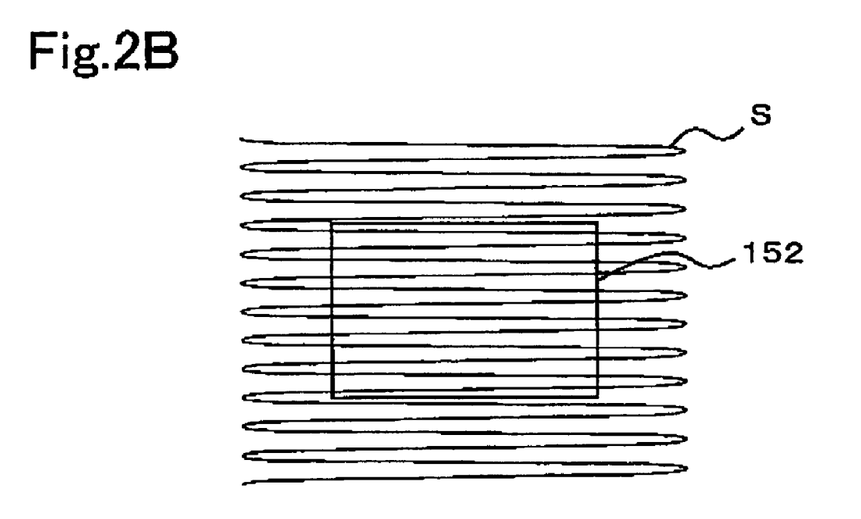

The vertical scanning system 19 is configured to scan the laser beams at a high speed, that is, at a high frequency by the horizontal scanning system 21. Further, the vertical scanning system 19 scans the beam light (optical flux) at a vertical scanning angle, while the horizontal scanning system 21 scans the beam light at a horizontal scanning angle. However, in this embodiment, the vertical scanning angle is set smaller than the horizontal scanning angle. As shown in FIG. 2A, since a display range 152 of an image has a length thereof in the vertical direction Y set shorter than a length thereof in the horizontal direction X, a scanning trajectory of the beam light also has a length thereof in the vertical direction Y set shorter than a length thereof in the horizontal direction X and hence, a vertical scanning angle in the vertical direction becomes smaller than a horizontal scanning angle in the horizontal direction. Accordingly, compared to the constitution shown in FIG. 2B which firstly scans beam light in the horizontal direction requiring a large scanning angle and, thereafter, scans the light beams in the vertical direction requiring a small scanning angle, the constitution shown in FIG. 2A which firstly scans the beam light in the vertical direction requiring a small scanning angle and, thereafter, scans the beam light in the horizontal direction requiring a large scanning angle can save a space.

In this embodiment, the vertical scanning system 19 requiring a small scanning angle is adopted as the scanning system for scanning the beam light at a high speed (high speed scanning system), while the horizontal scanning system 21 requiring a large scanning angle is adopted as the scanning system for scanning the beam light at a low speed (low speed scanning system). However, with respect to a normal image signal such as a signal defined by NTSC (National Television Standards Committee), the horizontal scanning corresponds to the high speed scanning and hence, although not shown in the drawing, image signals are formed into digital data by data conversion to allow the image signal supply circuit 3 to perform the horizontal scanning at a low speed and the vertical scanning at a high speed. It is needless to say that, assuming that the image signal inputted to the image signal supply circuit 3 is of a signal type in which the vertical scanning system 19 scans at a high speed, the present invention is applicable without particularly necessitating the above-mentioned conversion processing.

In this embodiment, the vertical scanning system 19 requiring a small scanning angle is adopted as the scanning system for scanning the beam light at a high speed (high speed scanning system) and the horizontal scanning system 21 requiring a large scanning angle is adopted as the scanning system for scanning the beam light at a low speed (low speed scanning system). However, the present invention is not limited to such a constitution. For example, the horizontal scanning system 21 requiring a large scanning angle may be adopted as the scanning system for scanning the beam light at a high speed (high speed scanning system) and the vertical scanning system 19 requiring a small scanning angle may be adopted as the scanning system for scanning the beam light at a low speed (low speed scanning system).

That is, since the vertical scanning angle (one example of primary scanning angle) for allowing scanning in the vertical direction (one example of primary direction) is set smaller than the horizontal scanning angle (one example of secondary scanning angle) for allowing scanning in the horizontal direction (one example of secondary direction), a scanning width of the beam light scanned in the vertical direction is set smaller than a scanning width of the beam light scanned in the horizontal direction. Accordingly, to take an optical path of the beam light to be scanned into consideration, it is possible to minimize a space in which the first relay optical system 18 for guiding the beam light to the vertical scanning system 19, the vertical scanning system 19, the second relay optical system 20 for guiding the beam light to the horizontal scanning system 21 from the vertical scanning system 19 and the like are arranged and hence, it is possible to further miniaturize the optical scanning device.

Further, the vertical scanning system 19, the horizontal scanning system 21 are configured such that, as shown in FIG. 1, the vertical scanning system 19 and the horizontal scanning system 21 are respectively connected to the image signal supply circuit 3 and scan the laser beam respectively in synchronism with the vertical synchronizing signal 5 and the horizontal synchronizing signal 6 outputted from the image signal supply circuit 3.

Here, the vertical scanning system 19, the horizontal scanning system 21 and the like according to this embodiment are exemplified as one example of the optical scanning device which forms a frame by scanning the incident optical flux in the primary direction as well as in the secondary direction approximately perpendicular to the primary direction.

The vertical scanning system 19 according to this embodiment corresponds to one example of a primary scanning part for scanning the incident beam light in the vertical direction, while the horizontal scanning system 21 according to this embodiment corresponds to one example of a secondary scanning part for scanning the beam light scanned in the vertical direction in the horizontal direction. Further, the second relay optical system 20 according to this embodiment corresponds to one example of a relay optical system (relay optical part).

Next, operational steps that the retinal scanning display 1 of one embodiment according to the present invention takes from the reception of the image signal from the outside to the projection of the image on the retina of the viewer are explained in conjunction with FIG. 1.

As shown in FIG. 1, in the retinal scanning display 1 of this embodiment, when the image signal supply circuit 3 formed in the light source unit part 2 receives the image signal from the outside, the image signal supply circuit 3 outputs the image signal 4 constituted of an R image signal, a G image signal and a B image signal for outputting laser beams of respective colors of red, green, blue, the vertical synchronizing signal 5 and the horizontal synchronizing signal 6. In response to the inputted R image signal, G image signal and B image signal, the R laser driver 10, the G laser driver 9 and the B laser driver 8 output respective driving signals to the R laser 13, the G laser 12 and the B laser 11. In response to these driving signals, the R laser 13, the G laser 12 and the B laser 11 respectively generate the laser beams whose intensities are modulated and output the respective laser beams to the collimation optical system 14. Further, the image signal supply circuit 3 generates the laser beams in response to a BD signal (not shown in the drawing) indicative of a driving state of the Galvano mirror 19a described later and controls timing for outputting the respective laser beams to the collimation optical system 14. That is, such a retinal scanning display 1 (image signal supply circuit 3) controls timing at which the optical flux is radiated to the Galvano mirror 19a or the like. The laser beams generated from spot light sources are respectively collimated into parallel lights by the collimation optical systems 14. Further, the laser beams are incident on the dichroic mirror 15 to be synthesized into one optical flux and, thereafter, the optical flux is guided to be incident on the optical fiber 17 by the coupling optical system 16.

The laser beams transmitted through the optical fiber 17 are guided from the optical fiber 17 by the first relay optical system 18 and are radiated to the vertical scanning system 19. The radiated laser beams are incident on a deflection plane 19b of the Galvano mirror 19a in the vertical scanning system 19. The laser beams which are incident on the deflection plane 19b of the Galvano mirror 19a are scanned in the vertical direction and, via the second relay optical system 20, are incident on the deflection plane 21b of the Galvano mirror 21a in the horizontal scanning system 21. In the second relay optical system 20, the deflection plane 19b of the Galvano mirror 19a and the deflection plane 21b of the Galvano mirror 21a are adjusted to assume a conjugative relationship and, further, an optical face falling error of the Galvano mirror 19a is corrected. The Galvano mirror 21a is reciprocally oscillated in synchronism with the horizontal synchronizing signal 6 in the same manner as the Galvano mirror to allow the deflection plane 21b of the Galvano mirror 21a to reflect the incident light in the horizontal direction. Accordingly, the laser beams are scanned in the horizontal direction using the Galvano mirror 21a. The laser beams which are two-dimensionally scanned in the horizontal direction and the vertical direction by the vertical scanning system 19 and the horizontal scanning system 21 are incident on the pupil 24 of the viewer using the third relay optical system 22 configured to make the deflection plane 21b of the Galvano mirror 21a and the pupil 24 of the viewer assume a conjugative relationship and, then, the laser beams are projected on the retina. The viewer can recognize an image formed by the laser beams which are two-dimensionally scanned and are projected on the retina in this manner. Although the Galvano mirror 19a in the vertical scanning system 19 and the Galvano mirror 21a in the horizontal scanning system 21 have been explained using the same name, that is, Galvano mirror, it is needless to say that, provided that a reflection surface can be oscillated (rotated) for scanning light, the reflection surface may be driven by a driving method of any type such as resonance type driving, non-resonance type driving, piezoelectric driving, electromagnetic driving, electrostatic driving or the like.

[Constitution of Various Optical Systems]

The constitution of various optical systems which guide the beam light radiated from the optical fiber 17 to the pupil 24 of the viewer while scanning the beam light two-dimensionally as described above is explained in conjunction with FIG. 3 to FIG. 5.

Figure 3:
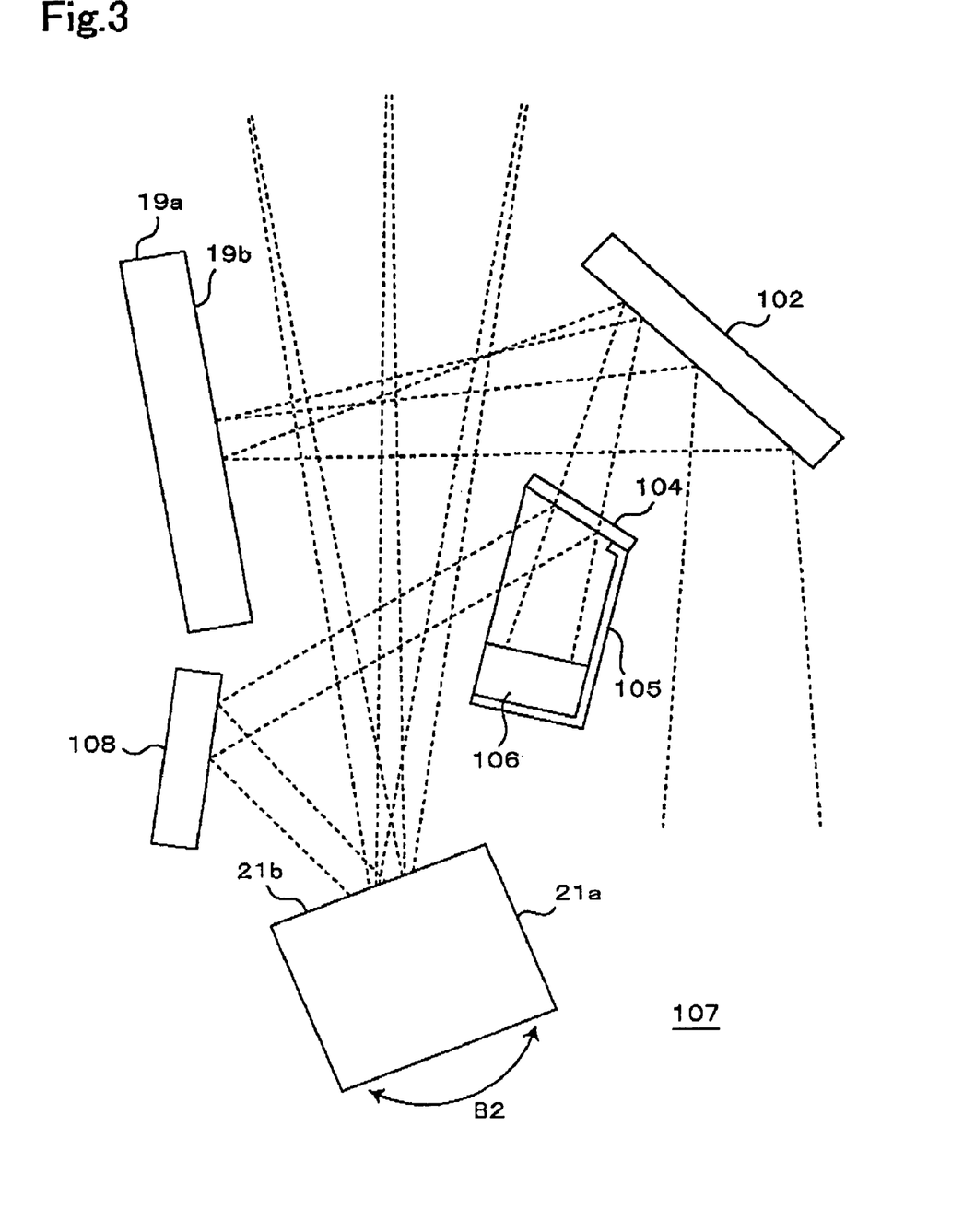
FIG. 3 is an explanatory view showing an optical system and an optical path of a laser beam in this embodiment.
Figure 4:
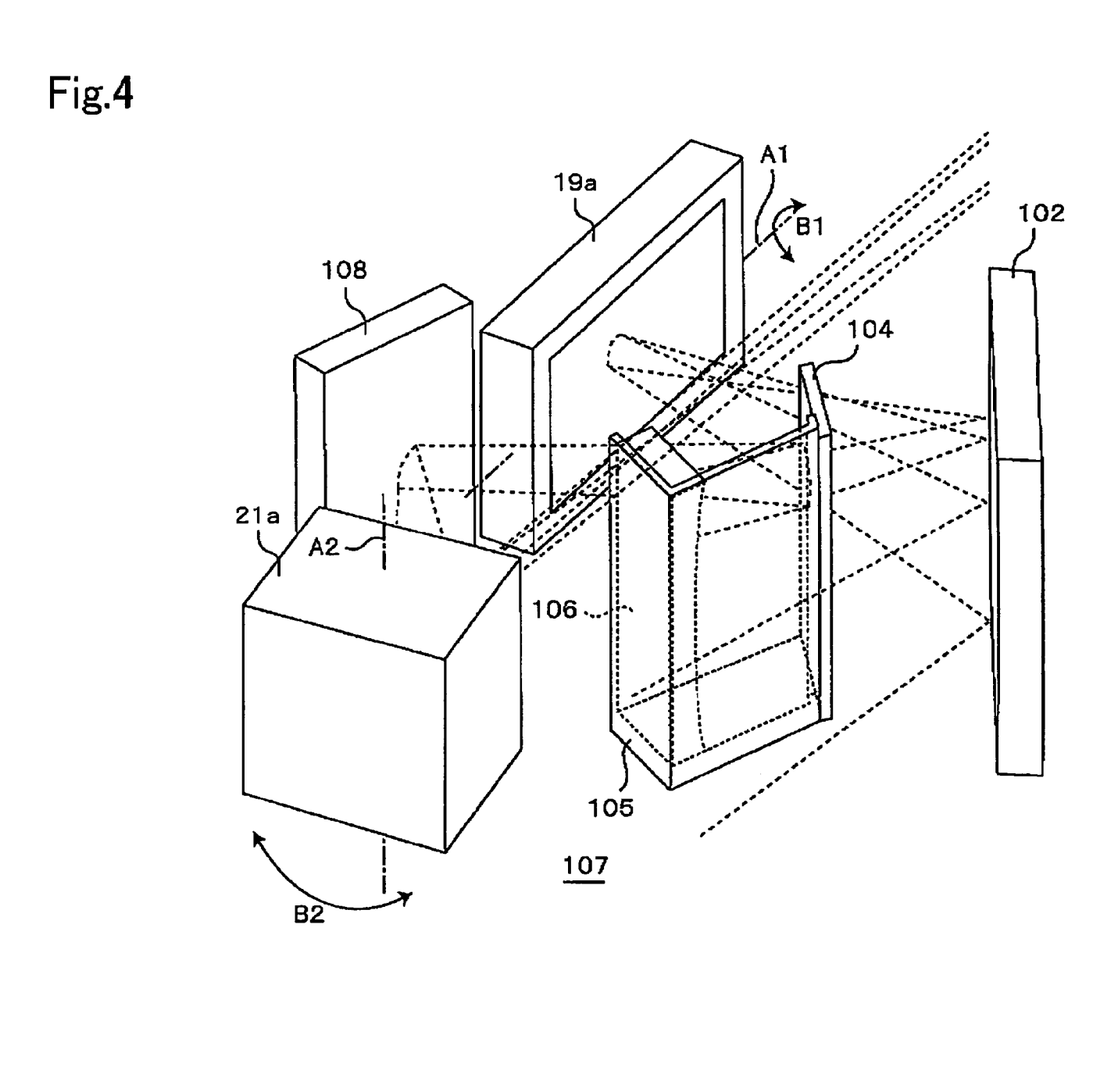
FIG. 4 is an explanatory view showing the optical system and the optical path of a laser beam in this embodiment.
Figure 5:
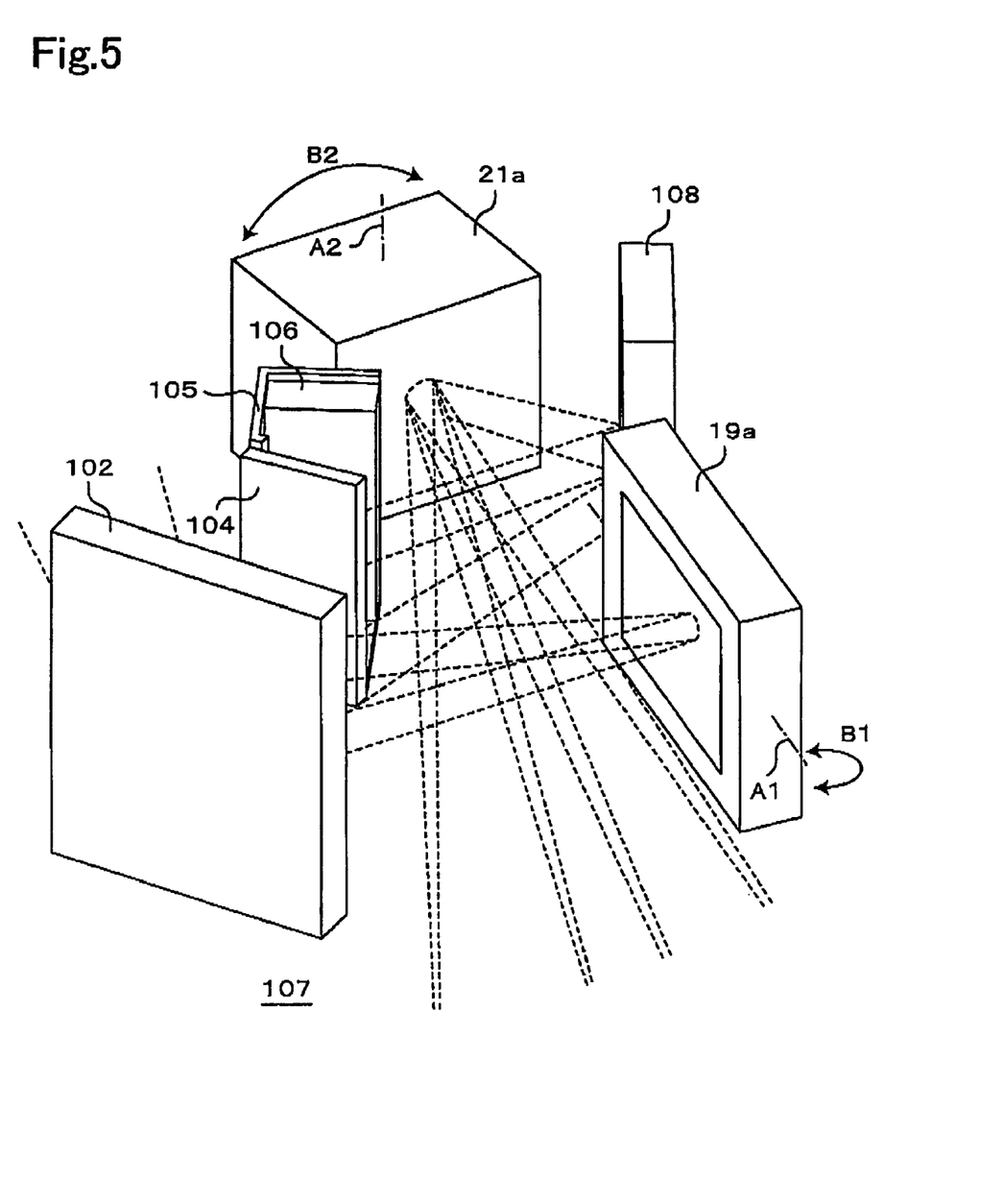
FIG. 5 is an explanatory view showing the optical system and the optical path of a laser beam in this embodiment.

Various optical systems include, as shown in FIG. 3 to FIG. 5, at least a first total reflection mirror 102, the Galvano mirror 19a, a half mirror 104, a concave-surface mirror 106, a second total reflection mirror 108, the Galvano mirror 21a and the like. The first total reflection mirror 102, the Galvano mirror 19a, the half mirror 104, the concave-surface mirror 106, the second total reflection mirror 108, the Galvano mirror 21a are supported on a support member 107 in a state that reflection surfaces thereof extend in the horizontal direction and are erected in the vertical direction. Further, the half mirror 104 and the concave-surface mirror 106 are integrally formed using a fixing member 105 (explained in detail later).

The first total reflection mirror 102 has a function of totally reflecting the beam light radiated from the optical fiber 17 so as to guide the beam light to a deflection plane 19b of the Galvano mirror 19a and, at the same time, totally reflects the beam light reflected by the deflection plane 19b of the Galvano mirror 19a and scanned in the vertical direction so as to guide the beam light to the half mirror 104. Here, the first total reflection mirror 102 is included in the above-mentioned first relay optical system 18 and the second relay optical system 20.

The Galvano mirror 19a is rotationally driven in the direction indicated by symbol B1 about an axis indicated by symbol A1 which extends in the horizontal direction and hence, the beam light which is reflected by the first total reflection mirror 102 is reflected by the deflection plane 19b for scanning of the beam light in the vertical direction and is guided to the first total reflection mirror 102.

The half mirror 104 has a function of allowing the beam light to pass therethrough and guiding the beam light reflected by the first total reflection mirror 102 to the concave-surface mirror 106. At the same time, the half mirror 104 has a function of reflecting the beam light reflected by the concave-surface mirror 106 and guiding the beam light to the second total reflection mirror 108. Here, the half mirror 104 is included in the above-mentioned second relay optical system 20.

The concave-surface mirror 106 is a condensing mirror for condensing the diffused beam light, and has a function of totally reflecting and condensing the beam light reflected by the first total reflection mirror 102 and allowed to pass through the half mirror 104 and guiding the beam light to the half mirror 104. Here, the concave-surface mirror 106 is included in the above-mentioned second relay optical system 20.

The second total reflection mirror 108 has a function of totally reflecting the beam light condensed by the concave-surface mirror 106 and reflected by the half mirror 104 and guiding the beam light to the deflection plane 21b of the Galvano mirror 21a. Here, the second total reflection mirror 108 is included in the above-mentioned second relay optical system 20.

The Galvano mirror 21a is rotationally driven in the direction indicated by symbol B2 about an axis indicated by symbol A2 which extends in the vertical direction. Accordingly, the beam light which is reflected by the second total reflection mirror 108 is reflected by the deflection plane 21b for scanning the beam light in the horizontal direction and is guided to the third relay optical system 22 (see FIG. 1).

In such various optical systems, the beam light radiated from the optical fiber 17 is condensed and is incident on the first total reflection mirror 102. The beam light incident on the first total reflection mirror 102 is incident on the Galvano mirror 19a in the vertical scanning system 19 after being totally reflected and condensed. The beam light incident on the Galvano mirror 19a in the vertical scanning system 19 is incident on the first total reflection mirror 102 after being scanned in the vertical direction. The beam light is condensed and, thereafter, is focused to form an image and is diffused before being incident on the first total reflection mirror 102 from the Galvano mirror 19a. Then, the beam light incident on the first total reflection mirror 102 is incident on the half mirror 104 after being totally reflected and diffused. Here, the beam light incident from the Galvano mirror 19a and the above-mentioned beam light radiated from the optical fiber 17 are respectively reflected on the same first total reflection mirror 102 at different portions. Then, the beam light incident on the half mirror 104 from the first total reflection mirror 102 is incident on the concave-surface mirror 106 after passing through the half mirror 104 at a predetermined ratio and being diffused. Although the beam light incident on the concave-surface mirror 106 is diffused until the beam light is incident on the concave-surface mirror 106, the beam light is incident on the half mirror 104 after being reflected and condensed.

The beam light incident on the half mirror 104 from the concave-surface mirror 106 is reflected on the half mirror 104 at a predetermined ratio and is incident on the second total reflection mirror 108 after being condensed. The beam light incident on the second total reflection mirror 108 is totally reflected and is incident on the Galvano mirror 21a in the horizontal scanning system 21 after being condensed. The beam light incident on the Galvano mirror 21a in the horizontal scanning system 21 is scanned in the horizontal direction and is incident on the third relay optical system 22 (see FIG. 1) after being condensed. In this manner, the diffused beam light is condensed by the concave-surface mirror 106 between the Galvano mirror 19a in the vertical scanning system 19 and the Galvano mirror 21a in the horizontal scanning system 21.

That is, the second relay optical system 20 is provided to an optical path formed between the vertical scanning system 19 and the horizontal scanning system 21 and includes at least the concave-surface mirror 106 which guides the optical flux scanned in the primary direction by the vertical scanning system 19 to the horizontal scanning system 21. Accordingly, although described in detail later, compared to the conventional constitution which does not include a concave-surface mirror but uses a first convex-surface lens for forming a diffused optical flux into a parallel optical flux and a second convex-surface lens for condensing the parallel optical flux and the like, for example, the constitution according to this embodiment does not require such convex-surface lenses and the like and hence, it is possible to miniaturize the optical scanning device. Further, the constitution according to the present invention can be also designed without taking chromatic aberration into consideration.

Further, a half mirror 104 is arranged between the Galvano mirror 19a of the vertical scanning system 19 and the concave-surface mirror 106 described later. In this manner, by arranging the half mirror 106 between the primary scanning part and the condensing mirror, an optical path can be folded back and hence, it is possible to effectively realize space saving thus achieving the further miniaturization of the optical scanning device.

Figure 6A:
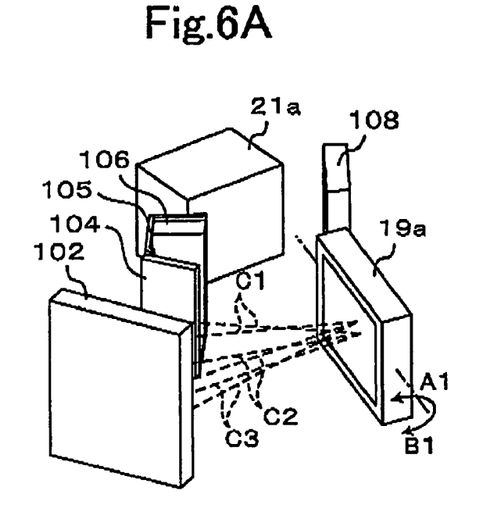
FIG. 6A to FIG. 6C are explanatory views showing the optical system and the optical path of a laser beam in this embodiment.
Figure 6B:
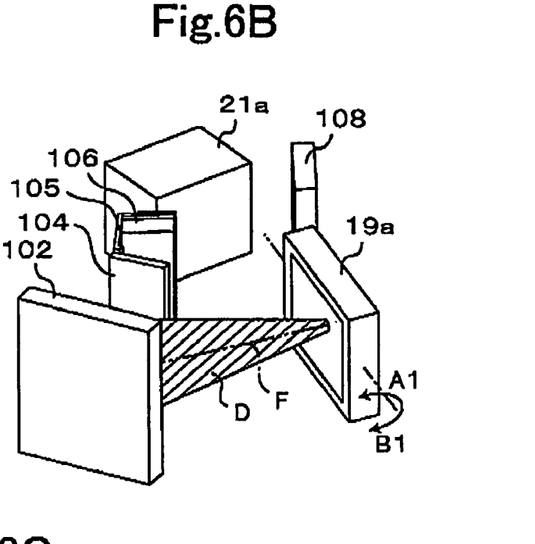
Figure 6C:
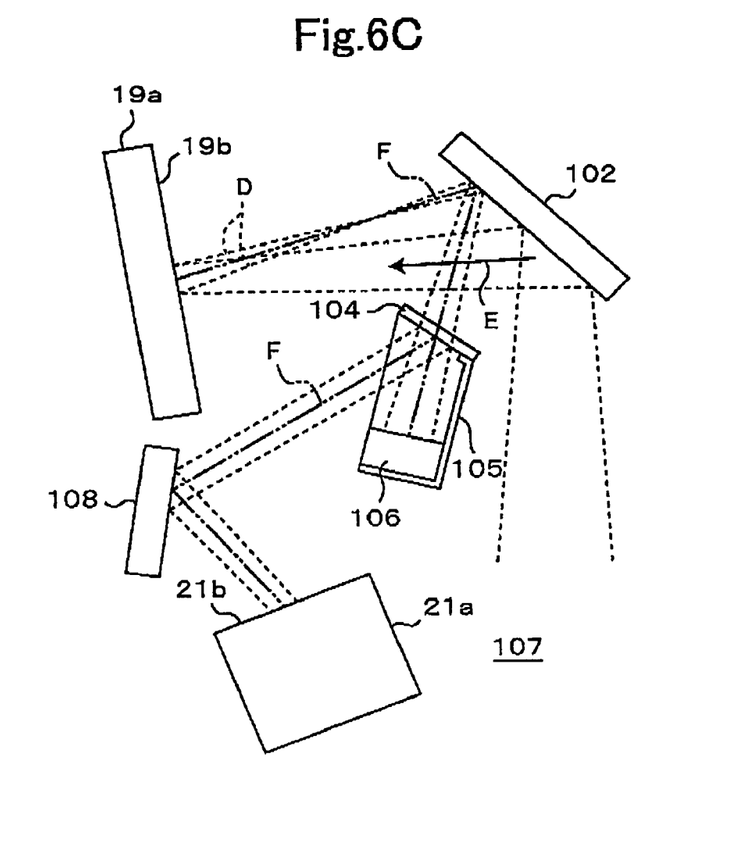

Particularly, the Galvano mirror 19a in the vertical scanning system 19 scans the beam light in the vertical direction as indicated by symbols C1, C2, C3 shown in FIG. 6A between the Galvano mirror 19a and the first total reflection mirror 102 and, as shown in FIG. 6B, a plane indicated by symbol D including the beam light which is scanned by the vertical scanning system 19 forms a vertical scanning plane. Further, to be more specific, as shown in FIG. 6C, a plane in the vertical direction which extends from the Galvano mirror 19a in the vertical scanning system 19 to the first total reflection mirror 102 forms the vertical scanning plane D which includes the beam light scanned by the vertical scanning system 19 and an approximately center line in the vertical scanning plane is assumed as a scanning center line F. Here, the vertical scanning plane according to this embodiment is a scanning plane which includes the optical flux from the vertical scanning to the horizontal scanning and also is a scanning plane of the optical path from the Galvano mirror 19a in the vertical scanning system 19 to the Galvano mirror 21a in the horizontal scanning system 21.

Further, the incident direction of the beam light incident on the Galvano mirror 19a in the vertical scanning system 19 is, as shown in FIG. 5C, a direction indicated by symbol E. That is, the beam light is incident from a direction which intersects the vertical scanning plane D. Accordingly, for example, when the optical scanning device includes various optical systems and scanning parts such as an optical system which allows the light beam to be incident on the primary scanning part, a relay optical system arranged between the primary scanning part and the secondary scanning part, the secondary scanning part and an optical system which guide the optical flux to the retina of an eye from the secondary scanning part, such optical systems and scanning parts do not interfere the primary scanning plane and hence, a space for ensuring the optical path of the optical flux can be easily ensured thus further miniaturizing the optical scanning device.

Further, the second relay optical system 20 which includes the first total reflection mirror 102, the half mirror 104, the concave-surface mirror 106, the second total reflection mirror 108 and the like is, as shown in FIG. 5B and FIG. 6C, formed in a state that a scanning center line F intersects the vertical scanning plane D. Due to such a constitution, for example, by allowing the scanning center line and the primary scanning plane to intersect each other, the condensed optical flux is diffused, and the diffused optical flux is condensed by the condensing mirror. Accordingly, when the optical scanning device includes various optical systems and scanning parts such as the optical system for allowing light to be incident on the primary scanning part and the relay optical system between the primary scanning part and the secondary scanning part, a space for assuring the optical path of the optical flux can be easily formed and hence, it is possible to further miniaturize the optical scanning device.

Figure 7A:
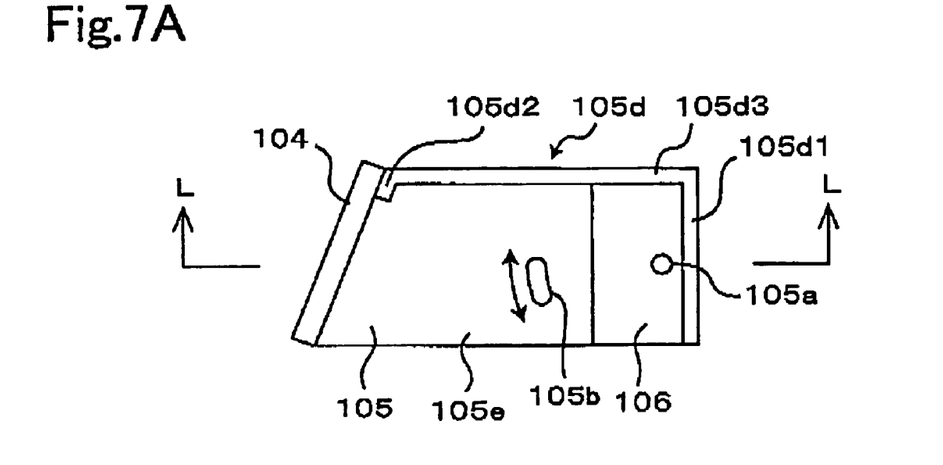
FIG. 7A and FIG. 7B are views showing the integral structure of a half mirror and a concave-surface mirror in this embodiment.

Next, the integrally-formed structure of the half mirror 104 and the concave-surface mirror 106 is explained in conjunction with the drawings. FIG. 7A is a plan view of the integrally-formed structure of the half mirror and the concave-surface mirror as viewed from above (as viewed from above in the same manner as FIG. 3), and FIG. 7B is a transverse cross-sectional view taken along a line L-L in FIG. 7A.

Figure 7B:
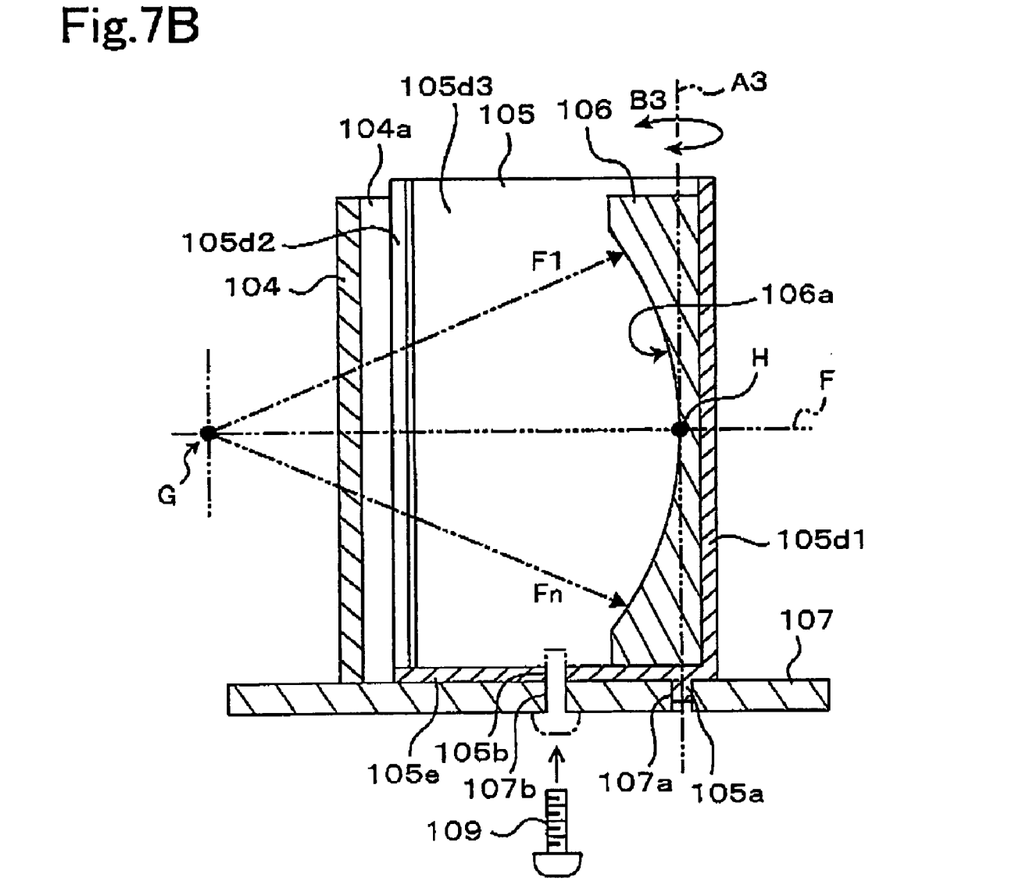

The half mirror 104 and the concave-surface mirror 106 are, as shown in FIG. 7A and FIG. 7B, integrally formed using the fixing member 105. The fixing member 105 includes a wall portion 105d having a substantial L-shape as viewed from above and a bottom portion 105e mounted on a lower end of the wall portion 105d and is formed of a flat plate having a trapezoidal shape as viewed from above.

The wall portion 105d is constituted of a first wall surface 105d1 which is in contact with a back surface of the concave-surface mirror 106, a second wall surface 105d2 which is in contact with one end of a reflection surface 104a of the half mirror 104 and a third wall surface 105d3 which connects the first wall surface 105d1 and the second wall surface 105d2. One end of the first wall surface 105d1 is connected to one end of the third wall surface 105d3 substantially perpendicularly, and another end of the third wall surface 105d3 is connected to one end of the second wall surface 105d2 with a predetermined angle therebetween.

Further, a back surface of the concave-surface mirror 106 and the first wall surface 105d1 are adhered to each other using an adhesive agent or the like, while the one end of the reflection surface 104a of the half mirror 104 and the second wall surface 105d2 are respectively adhered to each other using an adhesive agent or the like. Accordingly, the half mirror 104 and the concave-surface mirror 106 are formed integrally.

A projecting portion 105a having a cylindrical shape is formed on the bottom surface in a projecting manner. Further, in a substantially center portion of the bottom portion 105e, an elongated screw hole 105b is formed in the circumferential direction along the circumference about the projecting portion 105a.

The projecting portion 105a is inserted into and is rotatably fitted in a projection-mounting through hole 107a formed in a support member 107 about a rotation axis A3. Further, a length of the projecting portion 105a in an axis direction is set shorter than a length of the projection-mounting through hole 107a. Accordingly, when the projecting portion 105a is inserted into the projection-mounting through hole 107a, a distal end portion of the projecting portion 105a does not project from the bottom surface of the bottom portion 105e.

Further, the rotation axis A3 is an axis which passes an intersection point H where the scanning center line F of the optical flux scanned by the vertical scanning system 19 is in contact with a mirror surface 106a of the concave-surface mirror 106 and is arranged parallel to a vertical scanning direction (vertical direction). Accordingly, the half mirror 104 and the concave-surface mirror 106 can be rotated about the intersection point H at which the scanning center line F and the rotation axis A3 intersect each other in a rotation direction B3 of the rotation axis A3. Accordingly, it is possible to change the direction of the optical path without changing a distance between a scanning center G and the intersection point H.

Further, the support member 107 forms a screw hole 107b for a screw 109 therein, and the screw 109 is threadedly engaged with the screw hole 107b from a back surface of the support member 107 so as to fix the screw 109 to the support member 107 in a state that the screw 109 projects from a front surface of the support member 107. After the screw 109 is fixed to the support member 107, the half mirror 104 and the concave-surface mirror 106 integrally formed by the fixing member 105 are mounted on the support member 107 in a state that the screw 109 is inserted into the screw hole 105b formed in the fixing member 105 and, at the same time, the projecting portion 105a is fitted in the projection-mounting through hole 107a.

In this manner, the projecting portion 105a is fitted in the projection-mounting through hole 107a, and the screw 109 is inserted in the screw hole 105b formed in the fixing member 105 and hence, in a state that the half mirror 104 and the concave-surface mirror 106 formed as an integral body are mounted on the support member 107, the half mirror 104 and the concave-surface mirror 106 formed as an integral body can be easily integrally rotated about the rotation axis A3 in the rotation direction B3. Accordingly, while fixing a position at which the scanning center line of the optical flux scanned by the vertical scanning system 19 intersects the mirror surface 106a of the concave-surface mirror 106, it is possible to adjust the optical path by changing the position of the mirror surface 106a with respect to the vertically-scanned optical flux and hence, the adjusting operation is facilitated.

Further, the optical path is adjusted while changing the positions of the half mirror 104 and the concave-surface mirror 106 formed as an integral body about the rotation axis A3 and, thereafter, using an adhesive agent or the like, the projecting portion 105a is fixed to the projection-mounting through hole 107a. Then, the screw 109 is fixed to the bottom portion 105e. Due to such a constitution, the half mirror 104 and the concave-surface mirror 106 are fixed to the support member 107 so as to fix the positions of the half mirror 104 and the concave-surface mirror 106 after the above-mentioned adjustment.

In this manner, according to the above-mentioned embodiment, a rotary mechanism (here, the projecting portion 105a and the projection-mounting through hole 107a) for integrally rotating the concave-surface mirror 106 and the half mirror 104 is provided. Accordingly, the adjustment operation of the optical path is facilitated with respect to the concave-surface mirror 106 and the half mirror 104.

Here, in this embodiment, the explanation has been made with respect to a case in which the rotary mechanism is constituted of the projecting portion 105a and the projection-mounting through hole 107a. However, the rotary mechanism may be constituted such that an opening portion having a cylindrical shape is formed in the fixing-member-105 side and a projecting portion is formed on the support-member-107 side. That is, provided that a mechanism can integrally rotate the concave-surface mirror 106 and the half mirror 104, the mechanism is not limited to the above-mentioned mechanism.

Further, in the above-mentioned embodiment, the screw 109 is loosely fitted into the screw hole 105b with a play. However, a threaded groove may be formed in the screw hole 105b, and the bottom portion 105e may be fixed to the support member 107.

Figure 8:
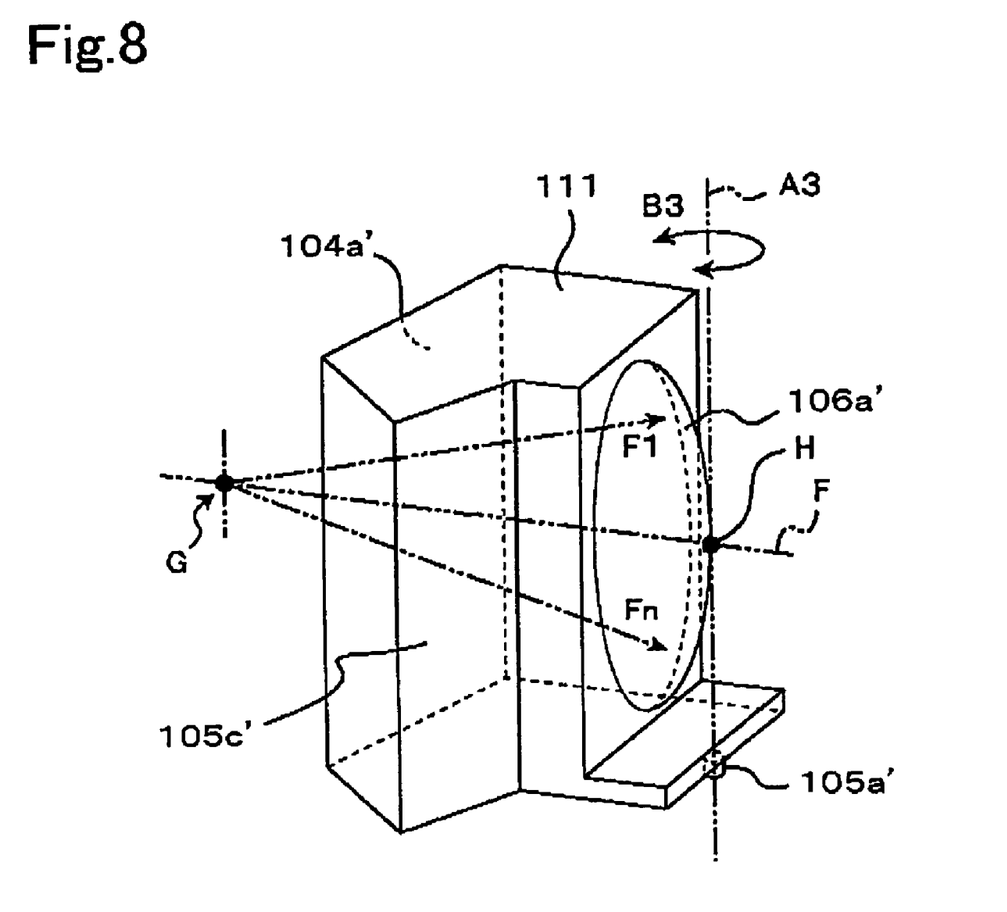
FIG. 8 is a view showing the integral structure of the half mirror and the concave-surface mirror in this embodiment.

Further, the concave-surface mirror 106 and the half mirror 104 may be integrally formed without using the fixing member 105 but using a prism. FIG. 8 shows one example of the constitution in which the concave-surface mirror 106 and the half mirror 104 are integrally formed using the prism.

As shown in FIG. 8, the prism 111 includes a convex portion 106a' which projects in a spherical shape, and a mirror film formed of a conductive paint layer, a conductive ink layer or a plating layer containing metal is formed on a surface of the convex portion 106a'. The mirror film has a reflection surface having a spherical shape substantially equal to the mirror surface 106a of the concave-surface mirror 106. Further, a first plane 104a' forming a surface on a side opposite to the convex portion 106a' has a half mirror function equivalent to a half mirror function of the half mirror 104. That is, the first plane 104a' forms a half mirror film formed of a conductive paint layer, a conductive ink layer or a plating layer containing metal formed on a surface thereof.

Further, the prism 111 includes a second plane 105c' at a position opposite to the first plane 104a'. Light radiated from the prism 111 is inclined at an angle which allows the light to be radiated from the second plane 105c'. Here, the second plane 105c' is formed of a plane which lines arranged at symmetrical positions with respect to the scanning center line F on a plane perpendicular to the first plane 104d intersect. Accordingly, the light radiated from the inside of the prism 111 is directly radiated straightly without being refracted on the second lane 105c'.

Further, the prism 111 forms a projecting portion 105a' substantially equal to the projecting portion 105a on a bottom surface thereof. By inserting the projecting portion 105a' in the projection-mounting through hole 107a, in the same manner as the case of the integral structure shown in FIG. 7A and FIG. 7B, the prism 111 can be rotated about the rotation axis A3 and hence, the optical path can be easily adjusted.

Further, in the prism 111, the half mirror 104 and the concave-surface mirror 106 can be integrally formed of a resin such as a thermoplastic resin or the like and hence, it is possible to enhance the positional accuracy between the half mirror 104 and the concave-surface mirror 106.

Figure 9A:
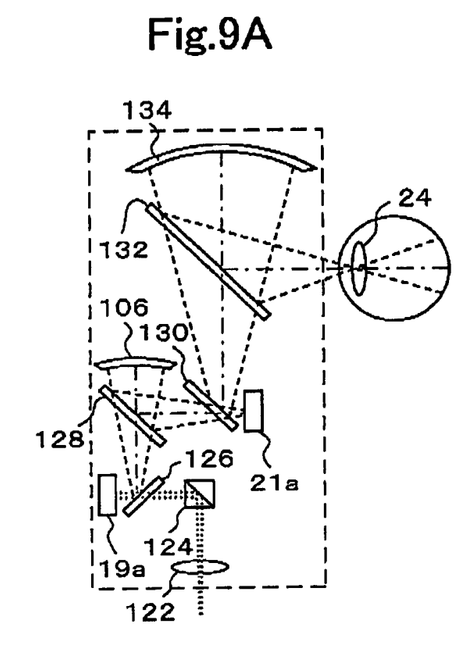
FIG. 9A to FIG. 9E are explanatory views showing the optical system and the optical path of laser beam in this embodiment.
Figure 9B:
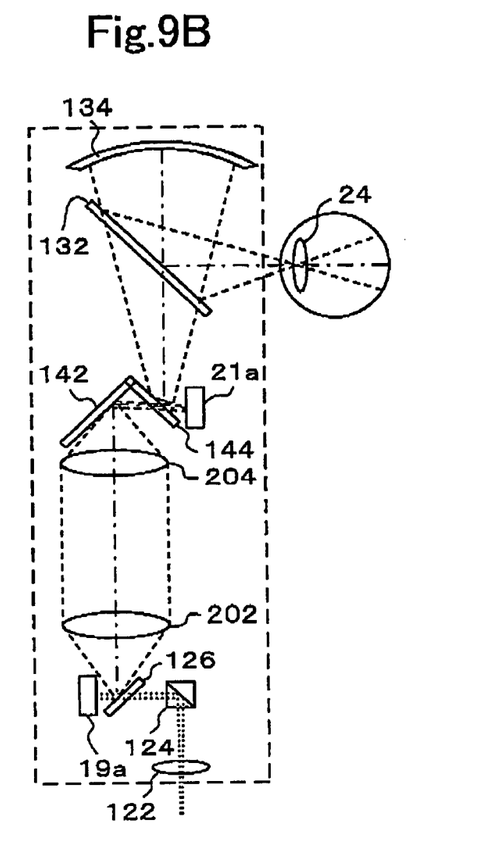
Figures 9C, 9D:
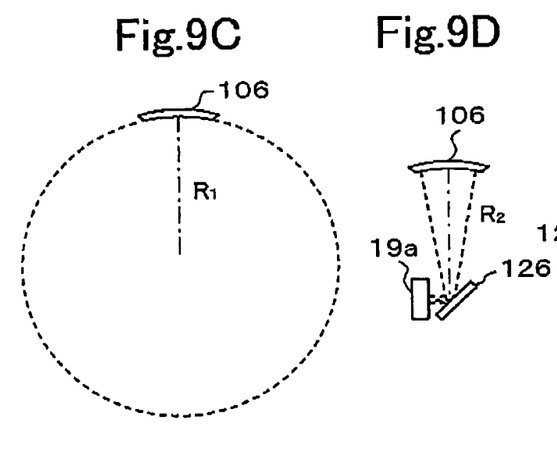
Figure 9E:
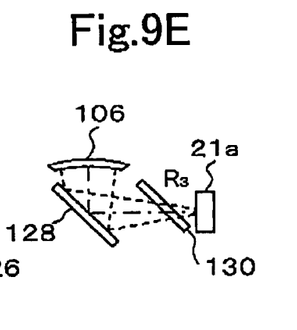

Further, to facilitate the understanding of the present invention also, a second embodiment which is different from the embodiment described above is explained hereinafter in conjunction with FIG. 9A to FIG. 9E. Here, FIG. 9A shows the constitution of various optical systems according to this embodiment, and FIG. 9B shows the constitution of the conventional various optical systems. Further, FIG. 9C shows a radius of curvature of the concave-surface mirror 106, FIG. 9D shows an optical path from the vertical scanning system 19 to a concave-surface mirror 106, and FIG. 9E shows an optical path from the concave-surface mirror 106 to a horizontal scanning system 21.

In this embodiment, as shown in FIG. 9A, the optical scanning device includes a convex-surface lens 122, a reflection mirror 124, a half mirror 126, a Galvano mirror 19a in the vertical scanning system 19, a half mirror 128, a concave-surface mirror 106, a half mirror 130, a Galvano mirror 21a in the horizontal scanning system 21, a half mirror 132 and a concave-surface mirror 134. In this optical scanning device, the incident beam light is scanned and guided to the pupil 24.

On the Galvano mirror 19a in the vertical scanning system 19, beam light radiated from the optical fiber 17 described above is incident via the convex-surface lens 122, the reflection mirror 124 and the half mirror 126. The Galvano mirror 19a in the vertical scanning system 19 scans the incident beam light in the vertical direction and guides the beam light to the half mirror 126.

The beam light scanned in this manner is reflected on the half mirror 126, passes through the half mirror 128 and is incident on the concave-surface mirror 106 after being diffused. The beam light incident on the concave-surface mirror 106 is, after being reflected and condensed, guided to the half mirror 128. The beam light reflected by the half mirror 128, after being condensed, passes through the half mirror 130 and is incident on the Galvano mirror 21a in the horizontal scanning system 21.

The Galvano mirror 21a in the horizontal scanning system 21 scans the incident beam light in the horizontal direction and guides the beam light to the half mirror 130. The beam light reflected by the half mirror 130, after being diffused, passes through the half mirror 132 and is incident on the concave-surface mirror 134. The beam light incident on the concave-surface mirror 134 is, after being reflected and condensed, guided to the half mirror 132, and the beam light reflected by the half mirror 132 is, after being condensed, incident on the pupil 24.

Conventionally, as shown in FIG. 9B, the optical scanning device includes a convex-surface lens 122, the reflection mirror 124, a half mirror 12S, a Galvano mirror 19a in a vertical scanning system 19, a convex-surface lens 202, a convex-surface lens 204, a reflection mirror 142, a half mirror 144, a Galvano mirror 21a in the horizontal scanning system 21, a half mirror 132 and a concave-surface mirror 134. In this optical scanning device, the incident beam light is scanned and is guided to a pupil 24.

In such a conventional constitution, the beam light scanned in the vertical direction using the Galvano mirror 19a in the vertical scanning system 19 is, after being diffused, reflected on the half mirror 126 and is formed into parallel beam light using the convex-surface lens 202 and, thereafter, the beam light is condensed using the convex-surface lens 204.

In this manner, according to this embodiment, the relay optical system including the concave-surface mirror 106 is arranged in an optical path formed between the Galvano mirror 19a in the vertical scanning system 19 and the Galvano mirror 21a in the horizontal scanning system 21. Accordingly, compared to the conventional optical scanning device which uses the convex-surface lens 202 for forming the diffused beam light into the parallel beam light, and a convex-surface lens 204 for condensing the parallel beam light and the like without using the concave-surface mirror 106, the optical scanning device of this embodiment does not require such convex-surface lenses 202, 204 and the like and hence, the optical scanning device can be miniaturized. Further, it is possible to design the optical scanning device without taking chromatic aberration or the like into consideration.

Here, a radius of curvature of such a concave-surface mirror 106 is indicated by symbol $R_1$ in FIG. 9C. The optical path from the Galvano mirror 19a in the vertical scanning system 19 to the concave-surface mirror 106 is indicated by symbol R2 in FIG. 9D. Further, the optical path from the concave-surface mirror 106 to the Galvano mirror 21a in the vertical scanning system 21 is indicated by symbol $R_3$ in FIG. 9E.

In this case, the Galvano mirror 19a in the vertical scanning system 19 and the Galvano mirror 21a in the vertical scanning system 21 are arranged with a distance such that a relationship of $R_1=R_2=R_3$ is established. In this manner, the Galvano mirror 19a in the vertical scanning system 19 and the Galvano mirror 21a in the horizontal scanning system 21 are arranged at positions away from the concave-surface mirror 106 by an optical path distance substantially equal to the radius of curvature of the concave-surface mirror 106. Accordingly, it is possible to easily adjust the primary scanning part and the secondary scanning part as conjugates and hence, the optical scanning device can perform the stable scanning of the optical flux and, at the same time, it is possible to miniaturize the optical scanning device.

Here, in the above-mentioned embodiment, the vertical scanning system 19 and the horizontal scanning system 21 are arranged at the positions away from the concave-surface mirror 106 by the optical path distance substantially equal to a radius of curvature of the concave-surface mirror 106. However, the present invention is not limited to such a constitution.

Further, in the above-mentioned embodiment, as shown in FIG. 9A, the condensing mirrors such as the concave-surface mirror are arranged between the vertical scanning system 19 and the horizontal scanning system 21 as well as between the horizontal scanning system 21 and the pupil 24 respectively. However, the present invention is not limited to such an amendment and, for example, the condensing mirror may not be arranged between the horizontal scanning system 21 and the pupil 24 so long as the condensing mirror is mounted at least between the vertical scanning system 19 and the horizontal scanning system 21.

Figure 10:
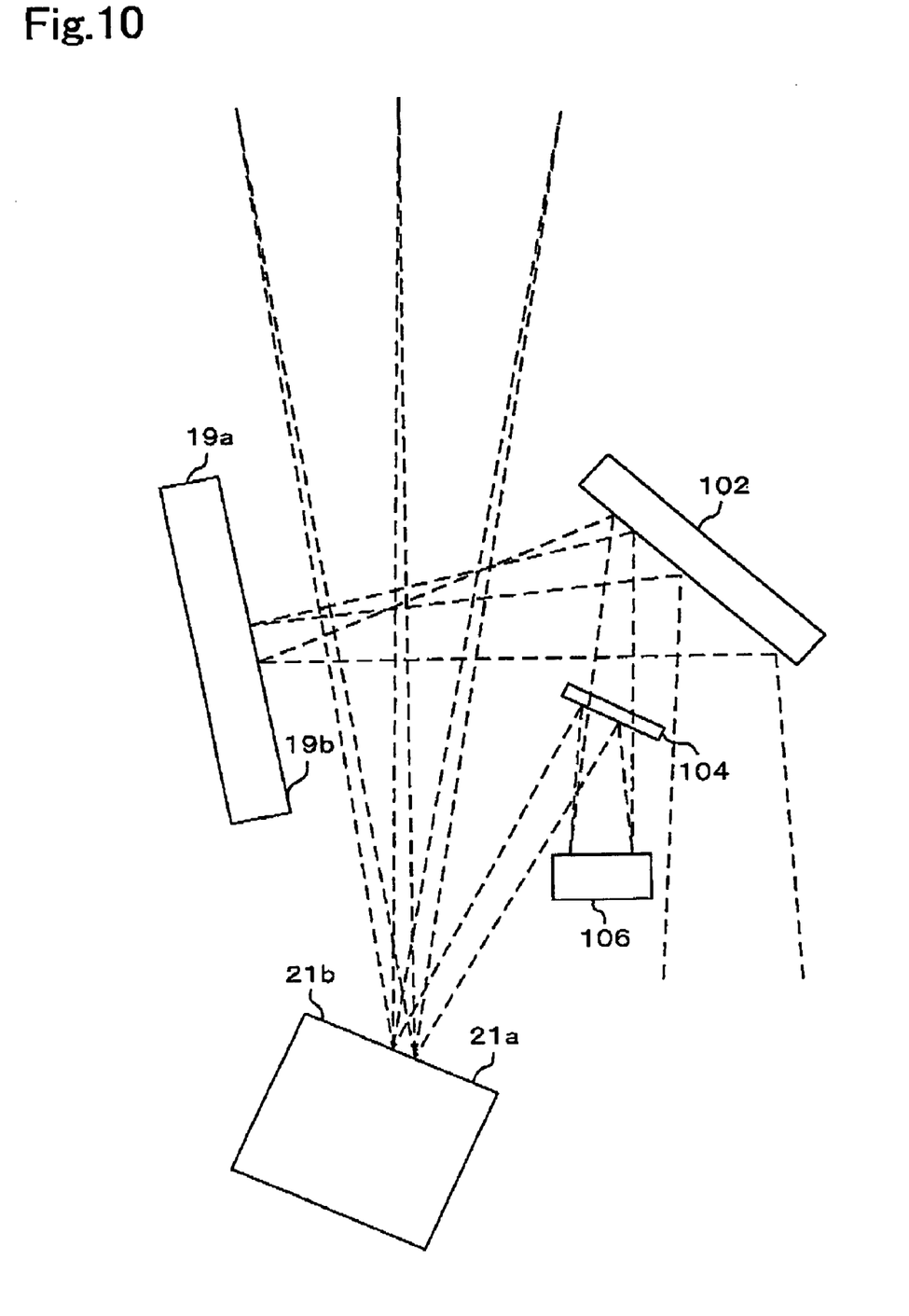
FIG. 10 is an explanatory view showing an optical system and an optical path of laser beam in this embodiment.

Still further, in the above-mentioned embodiment, as the example of relay optical system, the second relay optical system 20 having the above-mentioned constitution is adopted. However, the present invention is not limited to such an example. For example, as shown in FIG. 10, the optical scanning device may adopt the constitution other than the above-mentioned constitution such as constitution which does not include the second total reflection mirror 108. Further, for example, in this embodiment, the half mirror 104 is arranged between the vertical scanning system 19 and the concave-surface mirror 106. However, the present invention is not limited to such an arrangement. For example, the half mirror 104 may not be mounted between the vertical scanning system 19 and the concave-surface mirror 106. Further, for example, the half mirror 104 may be arranged at other position such as a position between the concave-surface mirror 106 and the horizontal scanning system 21.

Still further, in the above-mentioned embodiments, the relay optical system including the first total reflection mirror 102, the half mirror 104, the concave-surface mirror 106, the second total reflection mirror 108 and the like is mounted on the same plane which intersects the vertical scanning plane including the beam light scanned in the vertical direction by the vertical scanning system 19. However, the present invention is not limited to such a constitution. For example, a part or the whole of such a relay optical system may not be mounted on the same plane which intersects the vertical scanning plane including the beam light scanned in the vertical direction by the vertical scanning system. Further, in this embodiment, the optical flux is incident from the direction which intersects the primary scanning plane. However, the present invention is not limited to such a constitution. For example, the optical flux may not be incident from the direction which intersects the primary scanning plane.

Still further, in the above-mentioned embodiment, the vertical scanning angle at which the vertical scanning is performed by the vertical scanning system 19 is set smaller than the horizontal scanning angle at which the horizontal scanning is performed by the horizontal scanning system 21. However, the present invention is not limited to such a constitution. For example, the vertical scanning angle may be set to a value larger than or similar to the horizontal scanning angle.

Still further, in the above-mentioned embodiments, the beam light is firstly scanned in the vertical direction by the vertical scanning system 19 and, thereafter, the beam light is scanned in the horizontal direction by the horizontal scanning system 21. However, the present invention is not limited to such a constitution and, for example, the present invention may be constituted such that the beam light is firstly scanned in the horizontal direction by the horizontal scanning system and, thereafter, the beam light is scanned in the vertical direction by the vertical scanning system 19.

Still further, in the above-mentioned embodiment, the incident beam light is scanned in the vertical direction as well as the horizontal direction. However, the present invention is not limited to such a constitution and, for example, the present invention may be constituted such that the incident beam light is scanned in the primary direction as well as in the secondary direction which intersects the primary direction. Further, in this embodiment, the concave-surface mirror is adopted as an example of the condensing mirror. However, the present invention is not limited to such a constitution.

Still further, in the above-mentioned embodiments, the condensing mirror and the half mirror are integrally formed using the support member or the prism. However, the present invention is not limited to such a constitution. For example, the present invention may be constituted such that the condensing mirror is formed of a prism and the half mirror is directly mounted on the prism. In this manner, the condensing mirror and the half mirror may be integrally formed by any method provided that the method can integrally form the condensing mirror and the half mirror.

Still further, in the above-mentioned embodiments, as the example, the adhesive agent is used for integrally forming the condensing mirror and half mirror on the support member. However, the present invention is not limited to such a constitution. For example, the condensing mirror or the half mirror may be fixed to the support member by melting using heat or the like.

Still further, in the above-mentioned embodiments, an example which forms the screw hole 105b is explained. However, the present invention is not limited to such a constitution, and the screw hole 105b may not be formed.

Still further, in the above-mentioned embodiments, the explanation has been made with respect to the case in which the condensing mirror and the half mirror are adjustable only in the rotation direction B3 of the rotation axis A3. However, the present invention is not limited to such a constitution. That is, the condensing mirror and the half mirror are adjustable in the direction perpendicular to the support member 107. For example, female threads are formed in an inner periphery of the projection-mounting through hole 107a while male threads may be formed on the projecting portion 105a. Due to such a constitution, by rotating an integral body of the condensing mirror and the half mirror, a height of the integral body from the support member 107 is adjustable. Alternatively, without forming the screw hole 105*b* in the bottom portion 105*e*, the height may be adjusted by pushing up the bottom surface of the bottom portion 105*e* using the screw 109.

Still further, in the above-mentioned embodiments, the retinal scanning display 1 (one example of the retinal scanning-type imaging display device) which includes the optical scanning device as described above, and scans the optical flux modulated in response to the image signal in the primary direction and the secondary direction by the optical scanning device so as to project an image on the retina of the eye thus displaying an image on the retina has been explained. However, the present invention is not limited to such a constitution and, for example, without directly projecting the image on the retina of the eye, the present invention may be adopted to a display (one example of the imaging display device) which includes such an optical scanning device as described above and scans the optical flux which is modulated in response to the image signal in the primary direction and the secondary direction by the optical scanning devices so as to display the image on a screen or the like by projection.

Although the several embodiments of the present invention have been explained in detail heretofore in conjunction with the drawings, these embodiments are provided merely for an exemplary purpose, and the present invention can be exercised in other modes to which various modifications and improvements are applied based on knowledge of those who are skilled in the art including the mode described in the Disclosure of the Invention. For example, the optical scanning device to which the present invention is applied is also applicable to an optical scanning device for scanning laser beams in a laser printer.

What is claimed is:

1. An optical scanning device comprising:
   a primary scanning part for scanning an incident optical flux in a primary direction;
   a secondary scanning part for scanning the optical flux scanned in the primary direction in a secondary direction which intersects the primary direction; and
   a relay optical system arranged between the primary scanning part and the secondary scanning part, the relay optical system including at least a condensing mirror for guiding the optical flux scanned in the primary direction by the primary scanning part to the secondary scanning part and including a half mirror arranged between the primary scanning part and the condensing mirror.

2. An optical scanning device according to claim 1, wherein the half mirror is configured to allow the optical flux scanned in the primary direction by the primary scanning part to pass therethrough, to guide the optical flux to the condensing mirror, and to reflect and guide the optical flux condensed by the condensing mirror to the secondary scanning part, and the condensing mirror and the half mirror are integrally formed.

3. An optical scanning device according to claim 2 further comprising a rotary mechanism for integrally rotating the condensing mirror and the half mirror.

4. An optical scanning device according to claim 3, wherein the rotary mechanism is configured to be rotatable about an axis which passes a point where a scanning center line of the optical flux scanned by the primary scanning part is in contact with a mirror surface of the condensing mirror and is arranged parallel to the primary direction.

5. An optical scanning device according to claim 2, wherein the condensing mirror and the half mirror are integrally formed using a prism.

6. An optical scanning device according to claim 2 further comprising a support member for supporting the primary scanning part and the secondary scanning part, wherein the support member supports the condensing mirror and the half mirror which are integrally formed.

7. An optical scanning device according to claim 1, wherein the incident optical flux is allowed to be incident from a direction intersecting a primary scanning plane which includes the optical flux scanned by the primary scanning part.

8. An optical scanning device according to claim 7, wherein the relay optical system is arranged such that a scanning center line of the optical flux scanned by the primary scanning part intersects the primary scanning plane which includes the optical flux scanned by the primary scanning part.

9. An optical scanning device according to claim 1, wherein a primary scanning angle at which the optical flux is scanned in the primary direction by the primary scanning part is set smaller than a secondary scanning angle at which the optical flux is scanned in the secondary direction by the secondary scanning part.

10. An optical scanning device according to claim 1, wherein the condensing mirror is a concave-surface mirror.

11. An optical scanning device according to claim 10, wherein the primary scanning part and the secondary scanning part are arranged at positions away from the concave-surface mirror by an optical path distance substantially equal to a radius of curvature of the concave-surface mirror.

12. An imaging display device comprising the optical scanning device according to claim 1, wherein the optical flux modulated in response to an image signal is scanned in the primary direction as well as in the secondary direction by the optical scanning device to display an image.

13. A retinal scanning display comprising the optical scanning device according to claim 1, wherein the optical flux modulated in response to an image signal is scanned in the primary direction as well as in the secondary direction by the optical scanning device, and the scanned optical flux is guided to a retina of an eye to display an image on the retina by projection.

14. An optical scanning device according to claim 1, wherein the condensing mirror guides the optical flux by totally reflecting and condensing the optical flux.

* * * * *